Oct. 16, 1945.  H. C. KALWITZ  2,387,154
METHOD OF JOINING BUS-BARS
Filed Oct. 24, 1941  2 Sheets—Sheet 1
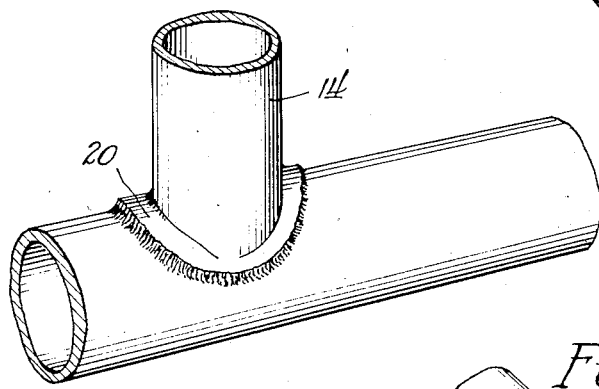
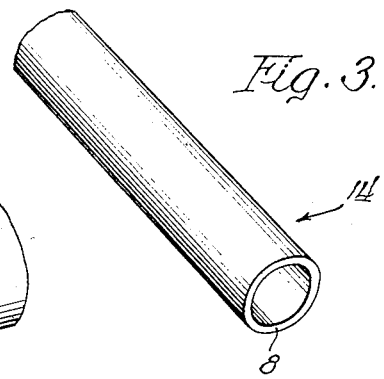
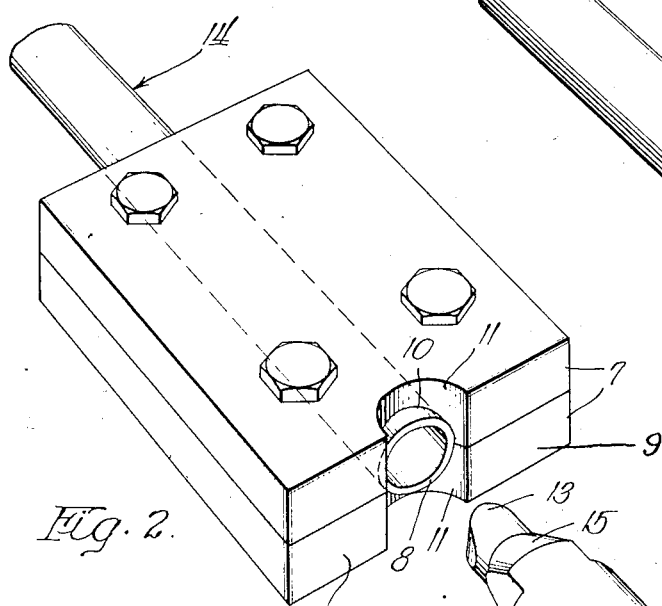
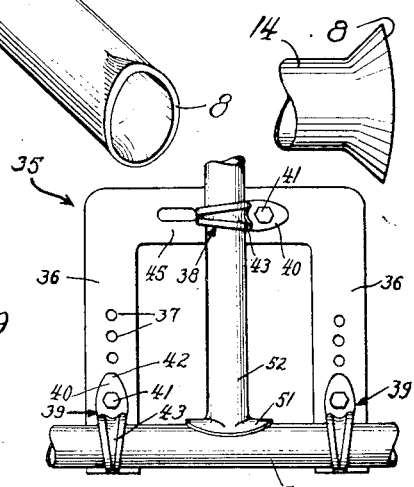
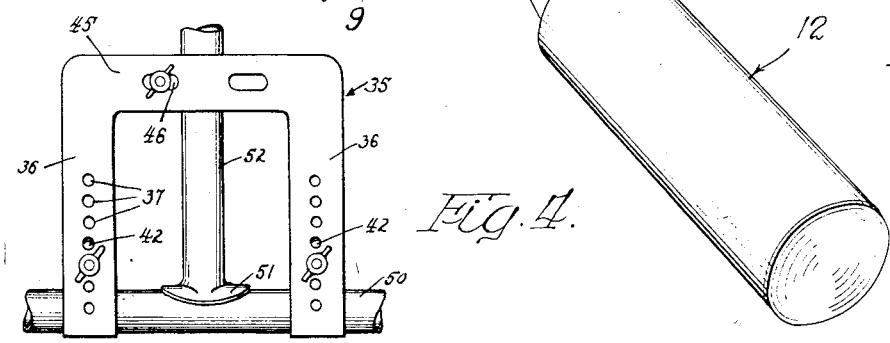
Inventor.
Herman C. Kalwitz.

Oct. 16, 1945.     H. C. KALWITZ     2,387,154
METHOD OF JOINING BUS-BARS
Filed Oct. 24, 1941     2 Sheets-Sheet 2
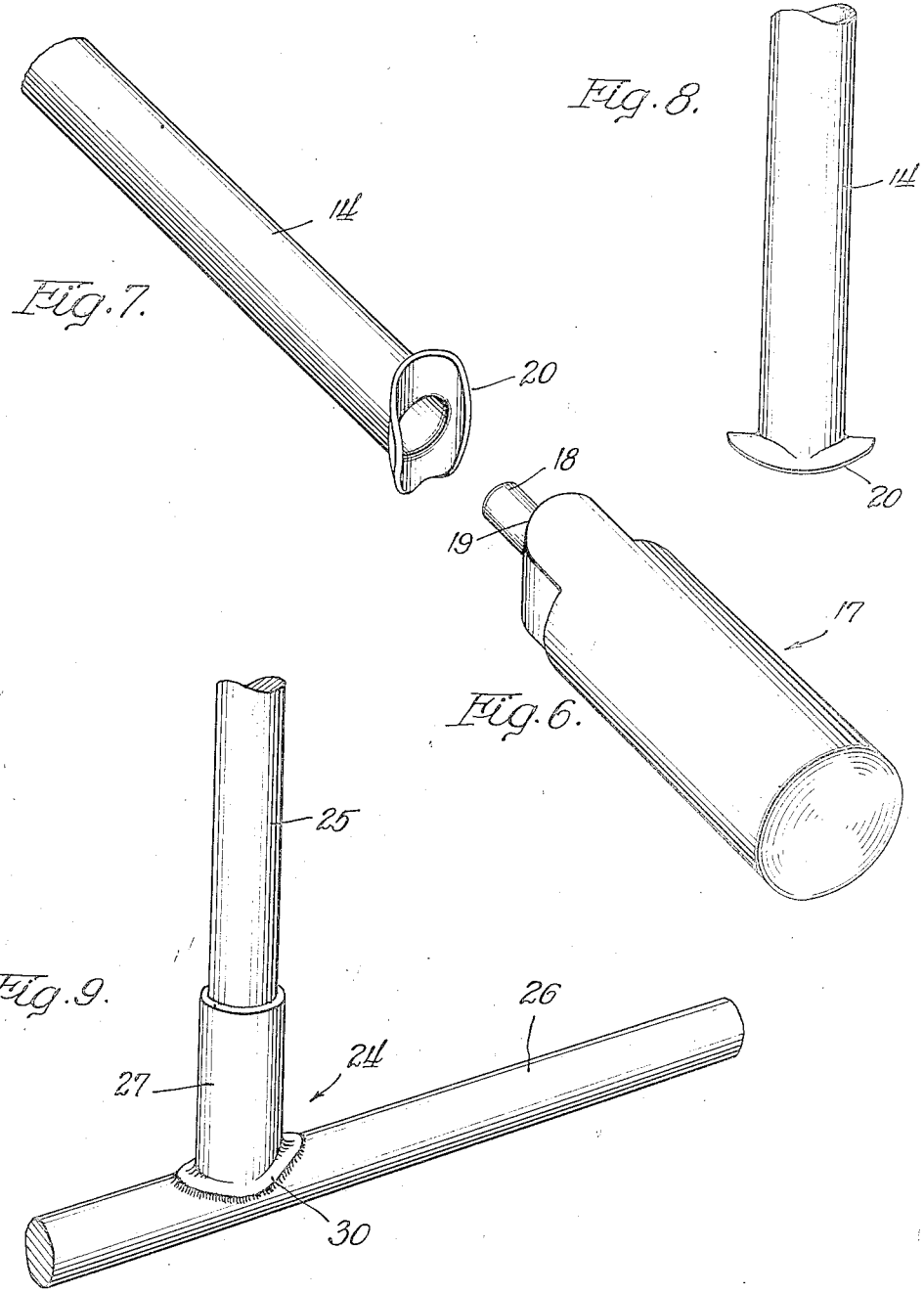
Inventor.
Herman C. Kalwitz Patented Oct. 16, 1945

2,387,154

UNITED STATES PATENT OFFICE 2,387,154

METHOD OF JOINING BUS BARS

Herman C. Kalwitz, Park Ridge, Ill.

Application October 24, 1941, Serial No. 416,330

2 Claims. (Cl. 29—148)

This invention relates to electrical connections and method of making the same, and more particularly to joints such as T-connections between tubular or cylindrical bus-bars and taps therefrom.

The general object of this invention is to provide an inexpensive electrical connection or joint of high permanent conductivity and great strength for tubular and cylindrical conductors. Bus bars are extensively used in power stations, substations, switch houses and switch boards for carrying heavy currents. The buses are used in rod, tubular, or bar form, depending upon the characteristics of the material used, amount of current to be carried, space available and other factors. However, where space permits, tubular buses are frequently used because they have maximum structural strength for equivalent cross-sectional area, thus permitting longer spans between supports; also because they have a much lower "skin-effect resistance" than strap bars. Furthermore, if the location of the buses is such that they must be insulated to avoid personal hazards due to high voltages, they are more easily insulated than flat bars.

The joints of flat bus bars are usually constructed by overlapping the ends of the bars and bolting them together. Sometimes the ends are soldered instead of being bolted. Connections of tubular buses and taps therefrom, on the other hand, are usually made by clamp connectors. Sometimes the tubing is flattened at the connecting point but this destroys the structural strength of the tubular shape of the bus. The disadvantages of clamping the tubes together are that the clamps have to be cast, drilled, carefully finished, and supplied with special bolting means. This means considerable expense due to costs of construction and amount of metal necessary to do the job. Furthermore, the tubes often fail to fully contact the inner surfaces of the clamp in the desired manner. This results in oxidation of parts not pressed tightly together, which causes reduced conductivity. The smaller area of contact also results in lowered conductivity. Heating of the joint by the load current causes deterioration of the joint. If insulation is necessary, it is difficult to apply over the irregular surface of the clamp. Therefore a new and better way of connecting together or tapping tubular and cylindrical buses was greatly needed.

There has long been a demand for a better and cheaper joint than the mechanical clamp joint, but until the advent of the present invention no satisfactory method of joining tubular conductors was known.

I have devised an inexpensive way of joining such conductors so that the junction will be good electrically and strong mechanically. The joint is preferably made substantially at right angles, but obviously may be made at such other angle as is desirable. In practice, T-joints and crosses are used. My novel method of making joints in tubular bus bars comprises flanging the end of one tubular conductor so that the surface of the flange is greater than the cross-sectional area of the conductor so flanged, and the flange is formed so as to fit the side of the other conductor. Said flange surface fits in such close proximity along the side of the other conductor that silver solder may be run in by capillary action to produce a joint that is strong and of high, permanent and uniform conductivity. The cost of such a connection is about one-seventh of the cost of clamping the tubes together, and the mechanical strength possessed by tubing is unimpaired.

The parts are fitted together so that there is a gap to be filled by the silver, and then the adjacent parts are heated either by an acetylene flame or by carbon blocks which are placed on the parts to be joined and heated by their resistance to a flow of electric current therethrough. This gap should be small enough that the melted silver will bridge the gap by capillarity. A gap of 7 to 10 mils or less is quite satisfactory. I have discovered that the silver has a peculiar action in that it will alloy very readily with the copper and will force its way along surfaces which appear to be solidly in contact and thereby force a fusion bond of alloy between those surfaces. The silver does not act like lead-tin solder but seems to dissolve a part of the surface metal of the copper parts. Molten silver appears to be highly fluid and finds its way over the entire area of the meeting surfaces.

I find that a further valuable feature of the invention resides in the combined relation of melting point, conductivity, temperature rise, and thermal coefficient of resistance in conjunction with the physical structure and the requirement of use here disclosed. Silver has a resistivity of approximately 1.59 as compared to copper 1.771 (hard drawn), 1.7241 (annealed) microhms per centimeter at 20° C. Copper melts at about 1083° C., silver at about 960° C. The temperature coefficient of resistance at 20° C. of copper is .00382 (hard drawn) and .00393 (annealed), whereas that of silver is approximately .00380;

tin is about .0042, and lead about .0043. The resistivity of tin and lead is far above that of copper or silver. At 20° C. tin has a resistivity of 11.5 and lead of 22.0. A solder of one-third tin and two-thirds lead has a resistivity of 13.5 at 15° C. and a melting point of about 190° C.

Bus bars are generally designed to permit a temperature rise of about 30° C. from an ambient temperature of 40° C. Now it can be seen that a joint made of lead-tin solder is basically bad because of the higher resistance, higher temperature coefficient and low melting point. The experience of the art has been that an ordinary soldered joint is an element of danger in a bus conductor designed to carry heavy currents.

The silver solder joint of my invention is made by shaping the parts to fit closely, clamping them together, heating them, and then running the silver into place. No matter how thick the layer of silver which forms the fusion bond, the resistance is not substantially greater than the resistance of an equal amount of copper. This provides an ideal joint which will run cool. And the greater the temperature rise, the more important does this become.

A flux consisting of borax or any of the commercial silver solder fluxes is preferably used.

So far as I am aware this novel property of silver solder, namely, its ability to fuse and alloy its way between the engaging surfaces of copper parts held in contact with each other, has not heretofore been employed in joining heavy current carrying parts.

Other objects and advantages of the present invention will appear more fully from the following detailed description which, taken in connection with the accompanying drawings, will disclose to those skilled in the art the particular construction, operation and use of a preferred form of the present invention.

In the drawings:

Figure 1 is a perspective view of a completed joint formed with the tap leading from the main bus at right angles;

Figure 2 shows the die with a pipe clamped therein ready to be formed;

Figure 3 shows a section of tube with its end cut off at right angles to its longitudinal axis ready to be placed in the die;

Figure 4 shows a perspective view of the first tool which is driven into the open end of the pipe of Figure 3 to spread it;

Figure 5 shows a perspective view of a section of pipe with the end expanded by use of the tool indicated in Figure 4;

Figure 5A shows a side view of the tube with its end expanded by the tool shown in Figure 4;

Figure 6 shows a perspective view of the finishing tool which completes the formation of the flange by being driven into the expanded end of the tube;

Figure 7 shows a perspective view of the tube with the flange completed;

Figure 8 shows a side view of the flange;

Figure 9 shows a connection between two cylindrical bars by use of a short section of tubing, with a flanged end, soldered to the two bars;

Figure 10 shows a front elevation of a convenient jig for holding the tubes to be joined in position for soldering; and Figure 11 shows the rear elevation of the same jig.

Referring now to Figures 1 through 8, two identical halves 7 of the die, when bolted together, produce a cylindrical hole 10 through the length of the die, which hole has a diameter substantially equal to the outside diameter of the tube to be flanged. The tube end to be formed into a flange is preferably first annealed as by heating.

Then the tube 14, before being bolted into the die, has its end portion 8 cut off at right angles to its longitudinal axis. The tube 14 is then bolted into the die so that its squared-off end 8 projects almost as far as the front walls 9 of the die. Each half 7 of the die has identical recesses 11 which are of a width somewhat greater than the diameter of the tube. The shape of these two recesses, when combined, is semi-circular, so that the completed flange will have an inside curvature the same as the outside curvature of the tube to which it will be joined. The width, depth and length of this recess are so computed that the completed action of the tools upon the tube and die will produce such expansion that the surface of the flange will engage the tube to which it is to be joined with a gap of 20 mils or less and the area of the flange will be substantially greater than the tube's own cross-sectional area.

The primary tool 12 has a pointed guide 13 of a diameter slightly less than the inside diameter of the tube 14 which is inserted into the squared-off end 8 of the tube 14 in order to center the tool. Then the tool 12 is driven forcefully, as by a hammer, into the tube 14 so that the inclined surfaces 15 can spread the end 8 of the tube 14. It will be noted that the inclined surfaces 15 are opposed to each other and are surfaces of a cone. However, there is not a complete cone formed on the tool 12 since the tool must fit into the semi-circular recess 11 of the die. Consequently the greatest expansion of the end 8 of the tube 14 is in the direction of the longitudinal axis of the recess 11, i. e., upwardly and downwardly. When the inclined surfaces 15 of the primary die have expanded the end 8 and driven it back against the back wall of the recess 11 of the die, the walls of the tube, at its end 8, have the shape of an oblong cone. (See Figure 5A.) It is then withdrawn and the end of the tube 14 appears as shown in Figure 5. Next the finishing tool 17 is used. Its guide 18 is inserted into the tube 14 and it is then driven forceably into fully seated position in the die. The head 19 of this die corresponds in shape to the recess 11 of the die and has a radius of curvature identical to the tube to which the flange will be fastened.

Upon seating the tool in final position in the die, the flange 20 is formed as is shown in Figures 7 and 8. These swaging operations performed by the portable female die 7—7 and the portable male dies 12 and 17 are entirely cold shaping operations which can be performed in situ so that the joint can be made without removing the tubular conductors from their final or permanent positions. After completing the cold swaging operation performed by the swaging tool 17, the flanged tube is then placed in a simple jig which clamps the main bus tube and the flanged tube against each other for soldering.

A convenient fixture for clamping the parts to be joined is illustrated in Figures 10 and 11.

The numeral 35 indicates the jig generally. This jig is made of flat metal strips welded into a U shape. Each arm 36 of the U has several holes 37 drilled through it at intervals through which bolts pass for holding the clamps 39 in place. The clamps 39 are formed so that they have a substantially flat flange 40 and a curved portion 43 which can extend over and across the rounded tube, the flat portions 40 bear partially or completely against the flat arms 36 depending upon the size of the tube being held and the clamps 39 are kept from pivoting about the bolts 41 by reason of the turned down ends 42 (see Figure 11) of the flanges 40. These turned down ends fit into an adjacent bolt hole 37.

The curved portions 43 hold the tube 50 against the arms 36. The preformed flange 51 of tube 52 is fitted over the tube 50 to which it is to be joined and the tube 52 is then clamped against the central portion 45 of the jig by another clamp 38. The slot 46 permits the clamp 38 to be slipped along it until the tube 52 and flange 51 are in exactly the desired position relative to tube 50. Then the bolt 41 is drawn up tightly and the two tubes which are now clamped in the same plane are ready for soldering.

Practically all bus-bars today are of copper because of the low resistance of that metal. Aluminum is used to some extent, and iron or steel pratically not at all. So, though my description of the method of forming the conductors to be joined together would apply to other conducting metals, my description (supra) of the solder and method of applying the same will be applicable only to the joining of copper conductors which, in practice, prevail almost exclusively.

In soldering the copper tubing, a silver solder is used. Pure silver would make an ideal connection for it has greater conductivity than the copper itself. But in order to produce a free flowing solder, other metals may be mixed with the silver. There are a number of commercial silver solders on the market of varying composition:

faces. This produces uniform conductivity and a joint stronger than the copper itself. Furthermore, unlike oxides of all the other metals, silver oxide is conductive, so the conductivity will be permanent.

The flange is cold-worked originally, though it may be annealed beforehand, but any internal stresses are removed during the soldering operation which anneals the copper.

Figure 9 shows a connection between two cylindrical rods 25 and 26 by means of a sleeve joint 24. This sleeve joint is comprised of a tube portion 27 and a flange 30 formed in the same manner as explained above. The radius of curvature of the flange 30 is the same as that of the cylindrical bus 26, and the inside diameter of the tube 24 is substantially the same as the outside diameter of the bus 25. Flux and then silver solder are introduced in the capillary spaces between the bus 26 and the flange 30, and also between the tube 24 and bus 25. In each case the area of contact is greater than the cross-sectional area of the corresponding buses. A strong, highly conductive connection results.

To reiterate briefly, my invention permits a long sought for means of inexpensively joining tubular and cylindrical copper bus-bars while at the same time making the joint stronger than the tubing itself. In addition, conductivity is improved and made uniform throughout the connection, as well as rendered permanent. The appearance of the joint is neat and non-bulky and easily subjected to insulation.

While I have shown and described above the preferred structure in which the principles of the present invention have been embodied, it is to be understood that my invention is not to be

| Name | Silver solder | | | | | |
|---|---|---|---|---|---|---|
| | Parts copper | Parts zinc | Parts silver | Temp. of fusion | Metals for which used | Flux commonly used |
| | | | | °C. | | |
| "Silfoss" | (¹) | (¹) | (¹) | 600 | Copper and iron | Borax. |
| No. 1 | 4.5 | 0.5 | 15.0 | 1005 | Copper, iron and gold | Do. |
| No. 2 | 6.5 | 2.0 | 11.0 | 983 | do | Do. |
| Coin silver | 1.0 | | 9.0 | 1035 | | |

¹ Contents not known—"Formula not published."

The solder chosen should have a conductivity of 85 per centum or greater of the copper tubing. The area of contact between the flange and tube—which area is greater than that of the tube which is flanged—more than compensates for the lowered conductivity. By way of example, a T-joint of copper tubing of ½" pipe size, as shown in Figure 3, made with "Silfoss" solder shows a conductivity of that of 140% of the tubing itself. The mechanical strength of the joint exceeds the cross sectional area of the tubing itself. Such a solder, e. g. "Silfoss," has a melting point of about 600° C. It is desirable that the solder have a melting point below that of copper so that during the soldering operation the copper tubing will not be melted or distorted, but the melting point of the solder should be high enough to keep it from melting and running out if the joint heats up for any reason.

When the flange is formed as explained above, it will fit the tube to which it is to be connected so closely that capillary action will draw the offered solder into the slight gap—preferably 7–10 mils or less—and allow it to flow freely all over between the surfaces, for silver tends to flow readily into capillary spaces between copper surlimited to the specific details shown and described, but that, in fact, other and different means may be employed in the practice of the broader aspects of my invention.

Therefore, what I claim and desire to secure by Letters Patent is:

1. The method of joining a tubular tap electrical conductor of copper to a cylindrical electrical bus conductor of copper in power stations, substations and the like where the conductors must remain substantially in their final positions during the joining operation, said method comprising performing swaging operations on said tap directly on the site where the finished joint is to be located by first securing a female shaping die over the end portion of said tap, driving into the end of said tap a first male die having diametrically opposite inclined surfaces which swage diametrically opposite portions of said tap outwardly at an incline so that the end of the tap assumes the general appearance of an oblong cone, then driving into said oblong cone a finishing tool having die surfaces corresponding substantially to the outer surface of the cylindrical bus conductor so as to form an integral cylindrical saddle on the end of said tap which closely fits the bus conductor, placing said saddle mechanically in contact with the bus conductor with intervening capillary spaces of 7 to 10 mils or less therebetween, heating the adjacent parts of the two conductors while maintained in such contacting relation to a temperature of approximately 600° C. or higher, and then flowing fused silver solder between the meeting surfaces of the saddle and the bus conductor, said silver solder flowing uphill in said capillary spaces by capillarity so as to complete portions of the joint higher than the points of introduction of the silver solder, said silver solder having a fusion temperature approximately in the range from 600° C. to 900° C. whereby it flows into said capillary spaces at temperatures below the melting point of copper but does not soften at high fault temperatures arising in the conductors.

2. A method of joining a tubular tap electrical conductor of copper to a cylindrical electrical bus conductor of copper in power stations, substations and the like where the conductors must remain substantially in their final positions during the joining operation, which method comprises cutting off the end of the tap substantially square, performing cold swaging operations on said tap conductor directly on the site where the finished joint is to be located by first securing a female shaping die over said square end, driving into said square end a first male die having diametrically opposite inclined surfaces which swage diametrically opposite portions of said tap outwardly at an incline so that the end of the tap assumes the general appearance of an oblong cone, then driving into said oblong cone a finishing tool having die surfaces corresponding in curvature substantially to the outer surface of said bus conductor so as to form an integral cylindrical saddle on said tap which closely fits said bus conductor, thereafter clamping said saddle mechanically in contact with the bus conductor, heating the adjacent parts of said two conductors to a temperature of 600° C. or higher, and then flowing fused silver solder between the meeting surfaces of the saddle and the bus conductor, said silver solder having a temperature coefficient of resistance closely approximating that of copper, and having a fusion temperature approximately in the range of from 600° C. to 900° C. so as to flow into spaces between said saddle and said bus conductor by capillarity at temperatures below the melting point of the copper, but not to soften at high fault temperatures arising in the conductors.

HERMAN C. KALWITZ.